(No Model.)
F. O. MATTHIESSEN & E. E. QUIMBY.
WASHING OUT STARCH TROUGHS.
No. 257,958. Patented May 16, 1882.
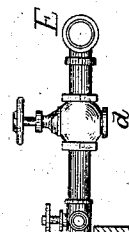
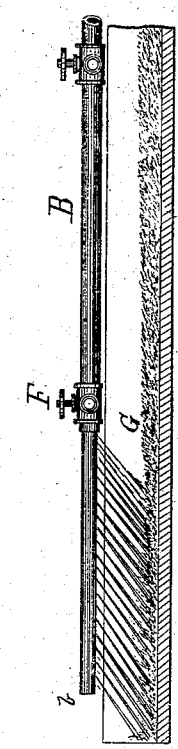
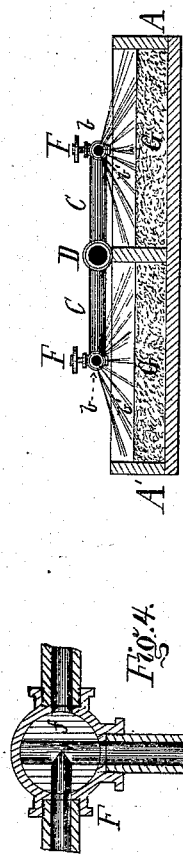
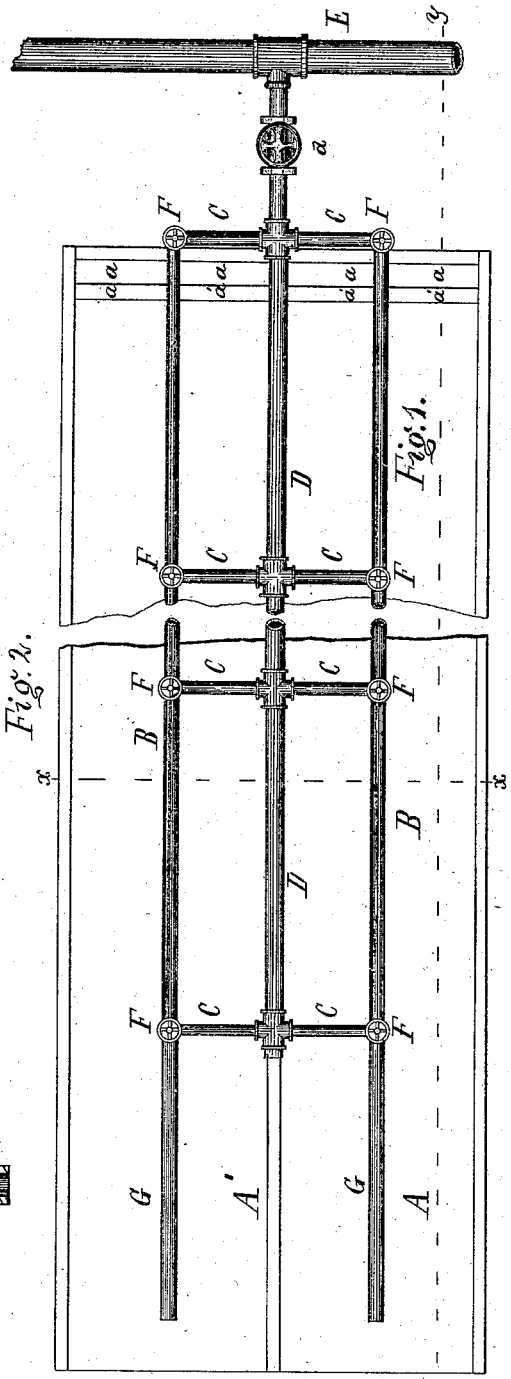
Witnesses
Inventors,

UNITED STATES PATENT OFFICE.

FRANZ O. MATTHIESSEN, OF IRVINGTON, NEW YORK, AND EDWARD E. QUIMBY, OF ORANGE, NEW JERSEY, ASSIGNORS TO THE CHICAGO SUGAR REFINING COMPANY, OF CHICAGO, ILLINOIS.

WASHING OUT STARCH-TROUGHS.

SPECIFICATION forming part of Letters Patent No. 257,958, dated May 16, 1882.

Application filed March 23, 1882. (No model.)

*To all whom it may concern:*

Be it known that we, FRANZ O. MATTHIESSEN, of Irvington, New York, and EDWARD E. QUIMBY, of Orange, New Jersey, have invented a certain Improvement in Washing Out Starch-Troughs, of which the following is a specification.

Our invention relates to apparatus for dislodging and carrying off the deposit of starch from the bottom of starch-troughs by means of powerful jets of water, which are directed downward upon the surface of the deposit with sufficient force and volume to stir it up and form a mixture of starch and water, which flows off by its own gravity from the lower end of the trough.

Our apparatus consists of a system of fixed jet-pipes arranged above the troughs; and our method of operation is a modification of that described in the pending application for a patent of Franz O. Matthiessen and Arno Behr, in which case a movable washer is employed, such movable washer being supplied at first with fresh water and afterward with a mixture of starch and water, in order not to too greatly dilute the starch dislodged from the bottom of the trough. In our invention we adopt the same expedient of using pure water at the commencement of the washing operation, and thereafter a mixture of starch and water; but when we have completed the washing out of the troughs we again employ pure water, in order to thoroughly wash out the pipes, and thereby prevent the settling of starch therein, which, if permitted, would clog the pipes and valves.

The accompanying drawings, representing two adjoining starch-troughs provided with our improvement, are as follows:

Figure 1 is a top view of the upper and lower portions of the two troughs and the jet-pipes, with the intervening portions broken out for convenience of condensing the drawings. Fig. 2 is a transverse vertical section through the line *x x* on Fig. 1. Fig. 3 is a longitudinal vertical section through the line *y y* on Fig. 1. Fig. 4 is a transverse section of the three-way valve inserted at the junction of the jet-pipes with the connecting-pipes by which they are respectively supplied.

The drawings represent two adjoining starch-troughs, A and A', having the usual inclination, each provided at its upper end with a well, *a*, for the reception of the starch-mixture, and with a dam, the face *a'* of which is inclined for facilitating the complete dislodgment of the starch deposit from the upper end of the trough. The perforated jet-pipes B B' extend longitudinally over the central portions of the troughs A and A', respectively, and are supplied with water or with a mixture of starch and water, as the case may be, through the connecting-pipes C, from the distributing-pipe D, which is connected with the service-pipe E and provided with the valve *d*. The distributing-pipe D is supported upon the partition-wall between the two troughs A and A', and the connecting-pipes C extend from the pipe D to the jet-pipes B and B', respectively, at intervals of a few feet, more or less. At the junctions of the spraying-pipes B and B' with the connecting-pipes C, respectively, we provide the three-way valves F, by which, as will be seen, the jet-pipes are cut up into sections, either one or more of which may be independently supplied with water from the distributing-pipe D by regulating the valves accordingly. The under portion of each of the jet-pipes is perforated with several longitudinal rows of holes, *b*, which are so inclined that the divergent jets of water *b'* discharged from them are projected forward and downward upon the surface of the starch deposit G. The mixture of starch and water overflowing from the lower end of the trough is caught in a suitable tank provided with a stirrer to prevent the settling of the starch, and after the first part of the washing operation the starch-water is pumped from the receiving-tank into the service-pipe E, for use in further washing out the trough. Pure water is used at the close of the washing operation for the purpose of keeping the pipes thoroughly free from any deposit of starch.

We claim as our invention—

1. In apparatus for washing out starch-troughs, a jet-pipe arranged over a starch-trough and having its lower portion perforated with rows of holes, substantially as shown, and provided at convenient distances apart with valves, and connecting-pipes connecting the jet-pipe with a distributing-pipe through which water or other liquid is supplied to the jet-pipe, the valves being arranged substantially as shown, so that either one or more of the sections of the jet-pipe between the valves may be independently supplied with the washing-liquid, as and for the purposes set forth.

2. The starch-troughs A and A', in combination with the distributing-pipe D, the jet-pipes B and B', the connecting-pipes C, and the valves F, as and for the purpose set forth.

F. O. MATTHIESSEN.
EDW. E. QUIMBY.

Witnesses:
ARNO BEHR,
M. L. ADAMS.